April 8, 1969 C. H. HAGEL 3,437,218
HELICAL ELEVATOR AND LOAD TRANSFER APPARATUS
FOR A STORAGE BUILDING
Filed Dec. 18, 1967 Sheet 1 of 2
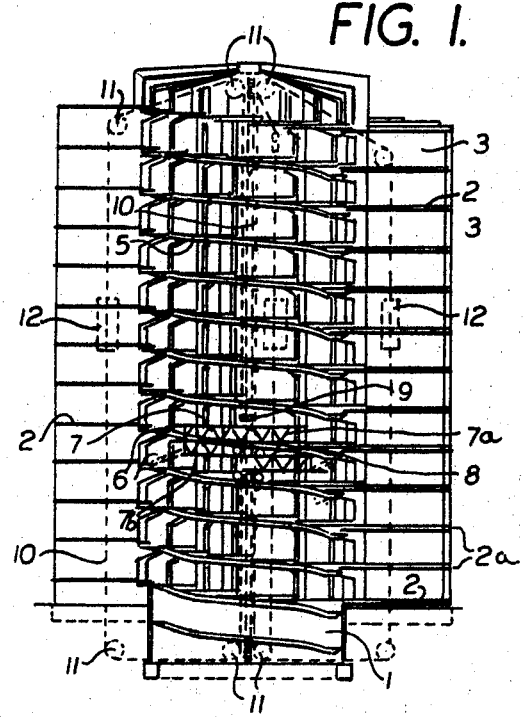
FIG. 1.
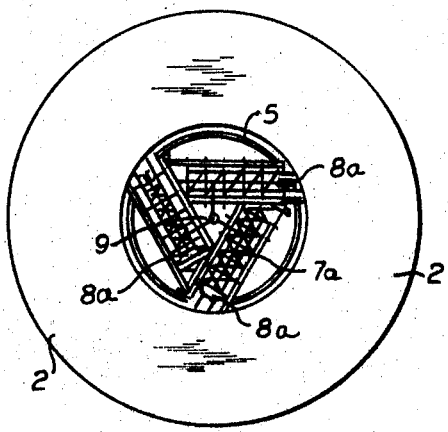
FIG. 2.
FIG. 11.
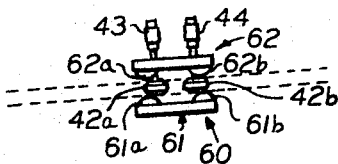
FIG. 9.
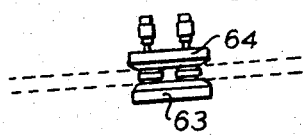
FIG. 10.
INVENTOR
CARL HEINRICH HAGEL
BY
Burgess, Dinklage + Sprung
ATTORNEYS.

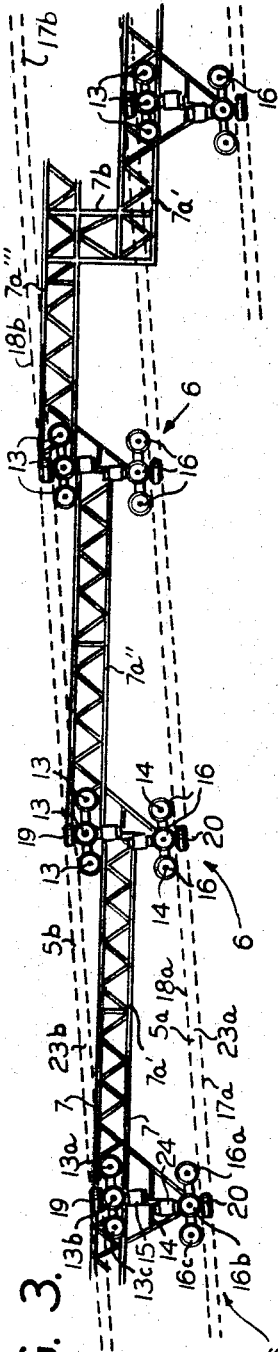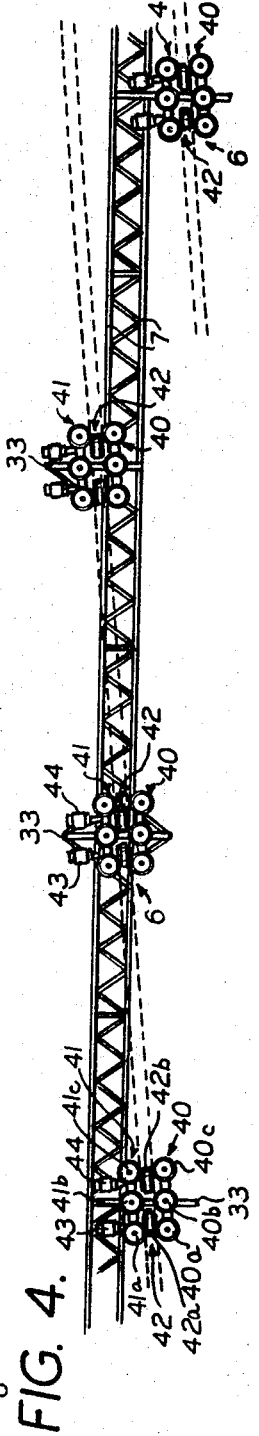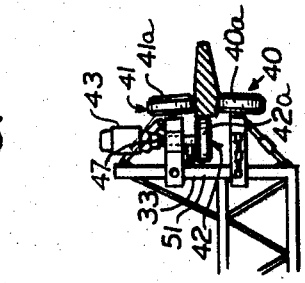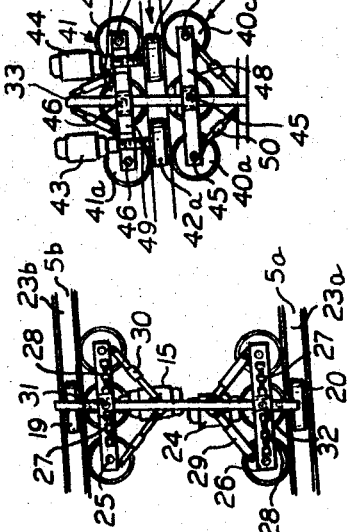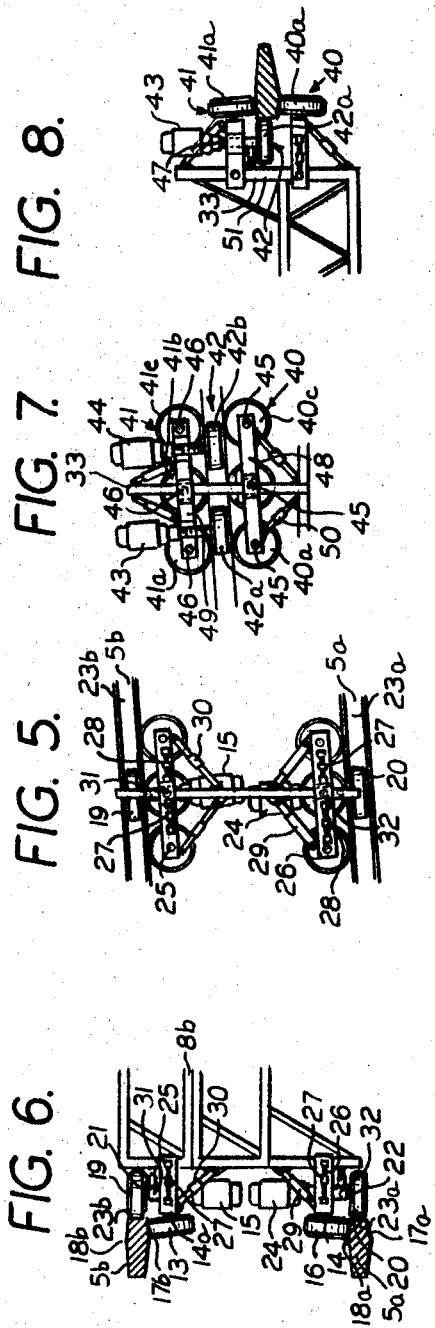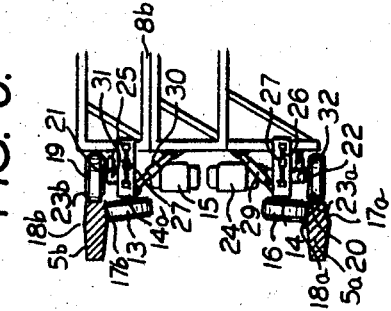

United States Patent Office  3,437,218
Patented Apr. 8, 1969

3,437,218
HELICAL ELEVATOR AND LOAD TRANSFER APPARATUS FOR A STORAGE BUILDING
Carl Heinrich Hagel, 24 Eintrachtstrasse,
46 Dortmund, Germany
Continuation-in-part of applications Ser. No. 442,645, Mar. 25, 1965, and Ser. No. 644,270, June 7, 1967.
This application Dec. 18, 1967, Ser. No. 691,278
Claims priority, application Austria, Apr. 13, 1964,
A 3,186/64
Int. Cl. E04h 6/40, 6/00
U.S. Cl. 214—16.1                   27 Claims

ABSTRACT OF THE DISCLOSURE

An elevator adapted for use in connection with a helically wound track which elevator is supported by the track at at least three points therealong with the support being through a combination of wheels or wheels and sliding surfaces.

---

This application is a continuation-in-part of application Ser. No. 422,645 filed Mar. 25, 1965, and application Ser. No. 644,270 filed June 7, 1967.

Elevators for raising and lowering loads which travel along a helical path are known. For example, it is known to provide a building with helically wound floor space wherein the pitch of the helix is equivalent to one floor height. In this known construction a substantially cylindrical core is provided with its axis coincident with the building axis. A helical track is provided generally corresponding to the helical floor space. The track has been made such that it contains a series of uniformly spaced apertures. The centrally disposed load carrying elevator rides on this track through a multiplicity of arms which rest on and mate with the track through a toothed wheel wherein the tooth alignment, frequency and size correspond to the apertures in the track (see U.S. Patent 1,709,914). A motor is provided mounted on the elevator which, through appropriate gearing rotates the toothed wheels whereby driving these wheels along the track through pressure exerted on the sides of the apertures by the teeth extending thereinto.

While this type of drive mechanism may well be operative, it will be appreciated that a "gear" type drive of this kind is mechanically inefficient and is quite noisy. Since elevators of the type described are eminently suited for use in connection with automobile parking which necessitates large equipment and rather heavy loads, the noise and efficiency problems mentioned above are likely to be aggravated. Further, devices of this type are often used in conjunction with office or apartment buildings, either as an adjunct thereto, in the same neighborhood or vicinity as such or even as the lower floors thereof. Such close proximity between people engaged in useful occupations, or people in their home, would be intolerable where the noise level was such as to be disturbing.

It is, therefore, an important object of this invention to provide a drive system for helical elevators which does not suffer from the disadvantages as the prior art systems.

It is another object of this invention to provide an improved drive mechanism for helical elevators.

It is a further object of this invention to provide a novel load carrying assembly for use in connection with helical elevators.

Other and additional objects of this invention will become apparent from a consideration of this entire specification including the claims and drawing thereof.

In accord with and fulfilling these objects, one aspect of this invention resides in a novel support system or assembly particularly designed for use in connection with elevators adapted to operate on a helical track. This novel support system comprises a support member adapted to be operatively associated with a relatively smooth (that is, unapertured or ungeared) helical track through a multiplicity of relatively smooth wheels (that is, ungeared or untoothed) or a combination of at least one wheel and at least two sliding surfaces.

According to one embodiment of this aspect of this invention a multiplicity of wheels are provided in combination with a support structure adapted to be associated with a smooth track wherein at least one wheel is adapted to bear against an upper surface of the track, at least one wheel is adapted to bear against a lower surface of the track and at least one wheel is adapted to bear against a surface of the track directed toward a vertical plane of the load carrying member supported thereby.

According to another embodiment of this aspect of this invention, two of the wheel means set forth above may be replaced by relatively smooth slidable members. Thus, for example, the wheel means directed against the upper and lower surfaces of the above mentioned helical track may be replaced by slidable bearing members which are adapted to slide along both of said track surfaces and to stabilize the load carrying member in a vertical direction in relation thereto. Wheel means are provided directed toward and bearing against the surface of the track directed toward a vertical plane of the load carrying member.

It is within the scope of this invention to provide a multiplicity of wheels, or wheel and slidable members, in combination with a support structure therefor attached to a load bearing member, in such manner that instead of the wheel assembly "surrounding" a portion of the helical track, the wheel assembly spans two flights of such track. In this embodiment, one or more wheels or slidable members bear against the lower surface of one flight of the helical track while one or more other wheels or slidable members bear against the upper surface of the next lower flight of the helical track. One or more wheel members bear against the surface of at least one of said flights directed toward a vertical plane of the load carrying means. Suitable structural elements join the wheel means or wheel and slidable member means together.

According to a preferred embodiment of this aspect of this invention, regardless of whether slidable or wheel bearing elements are used as set forth above, the wheel means directed toward the surface of the track is directly or indirectly driven by motor means and serves to propel the load carrying means along the helical track. It is also within the scope of this aspect of this invention to provide as the power transmission or drive wheel, a wheel means other than that which bears against the track surface directed toward a vertical plane of the load carrying member.

The wheel means according to this invention may suitably be of substantially any conventional wheel construction. For example, the wheel may be made of resilient material, such as natural or synthetic rubber, resilient plastics, etc. Where the wheel means is made of a resilient material, such wheel may be pneumatic or solid as desired. The wheel means may also be made of a substantially non-resilient material, such as, for example, steel, in the manner of railroad wheels. It is preferred in the practice of this invention, to utilize pneumatic or solid resilient wheels, most preferably solid.

It will, of course, be understood that the usual auxiliary equipment normally associated with wheels, such as axles, spring means, shock absorber means, bearing means, etc., are intended to be encompassed within the purview of this description. Since this auxiliary equipment is substantially conventional, no detailed description thereof is undertaken herein.

It has been pointed out above that it is known to provide helically operating elevators with self-contained motive power sources. That is, it is known to mount a motor on the elevator and to drive the motive means, gears, wheels, etc., from this motor. In the case where such motor is an electric motor, electric power supply means has to be provided from an external source of electric power, suitably as one or more cables passing upwardly or downwardly from the load carrying member or elevator platform with sufficient slack provided in the cables to enable full upward and downward movement of the elevator without loss of power.

In a particularly preferred embodiment of this invention, motor drive means is mounted on the drive wheel itself, or at least directly within the immediate vicinity thereof. By so designing and positioning the motor drive means immediately adjacent the drive wheel or wheels, it is possible to significantly reduce mechanical inefficiencies which are introduced in mechanical or hydraulic power transmission systems. Further the noise factor is reduced since mechanical or hydraulic power transmission noise is substantially eliminated. Further significantly greater simplicity of design and operation are permitted by avoiding the necessity of providing a multiplicity of power transmission linkages. Most important, however, particularly where electric motors are employed, the safety factor of the entire elevator assembly is markedly increased. This is accomplished by providing several electric motors each at a different driven wheel. If one of the motors should become inoperative for any reason, the remaining motors will be capable of safely lowering the elevator in a smooth and trouble free manner. Further, by operating in this manner, it is possible to employ one or more motors simultaneously depending on the load being carried.

According to another aspect of this invention, a novel elevator load carrying or carriage assembly is provided. This load carrying assembly is most suited to use in connection with an elevator adapted to ride on a helical track which elevator is disposed within the helical track. More specifically, the undercarriage of this aspect of this invention is particularly suited to use in a shaft type helically operating elevator.

The undercarriage of this aspect of this invention is basically triangular in overall shape, preferably an equilateral triangle. Each leg of the triangle is a structural assembly constructed in the usual or conventional manner and each is affixed to the other legs. Each leg of the triangular undercarriage may be assembled with the other legs so as to produce a final substantially monoplanar assembly. Alternately, the individual legs may be joined together stepwise, that is with the top of one leg joined to the bottom of its next adjacent leg. Since this structure is intended to ride in a helix, it is preferred that at least one, and preferably all the legs of the triangle present a substantially horizontal upper surface suitable for carrying loads thereon. In order to accomplish this preferred objective, the top of a first leg is attached to the bottom of a second leg, the top of the second leg is attached to the bottom of a third leg, and the top of the third leg is attached, through spacer means, to the bottom of the first leg. It will be appreciated that it is the ends of each respective leg that are so attached in order to form a triangle. It is preferred that the cumulative leg height is equal to the pitch of the helical track so that only one spacer means need be used. It is of course to be understood that each leg may have a height less than one third of the pitch of the helical track in which case spacer means will be required between each end attachment, with longer spacer means at the first-third leg attachment.

The undercarriage of this aspect of this invention is intended for use in combination with the wheel assembly described above. For this purpose it is suitable to provide a triangular undercarriage with three sets of wheels, or wheel and slidable member, means. The preferred arrangement is to provide a wheel means at the point of juncture of each pair of legs of the triangle.

Where the undercarriage is assembled so as to form a substantially monoplanar assembly, each wheel means assembly is mounted at a different height relationship to the undercarriage. Thus for example the wheel assembly at the intersection of the first and the third legs may be mounted in such manner as to be below the plane of the undercarriage; the wheel assembly at the intersection of the first and second legs may be mounted in such manner as to be substantially coplanar with the plane of the undercarriage; and the wheel assembly at the intersection of the second and third legs may be mounted in such manner as to be above the plane of the undercarriage.

Where the undercarriage is substantially monoplanar, it is preferred that this plane is substantially horizontal. Since the helical track, with which the undercarriage is associated through the wheel assemblies, is always canted from the horizontal, the wheel assemblies themselves must be so constructed and arranged as to have their riding plane coincident with the plane of the helical track. The riding plane of the wheel assemblies will therefore be canted with respect to the plane of the undercarriage.

Where the undercarriage is assembled in such manner that the legs are not coplanar but are each in different planes, preferably parallel planes, and are joined together at the ends, respectively, thereof, with or without the aid of spacer tying means, the wheel assemblies may be mounted at substantially the same relative position with respect to each leg intersection and thereby suitably engage the helical track at an appropriate position. In this embodiment the wheel assemblies may be mounted above or below the leg intersections but preferably are not. The wheel assemblies are mounted with their riding planes corresponding to the plane of the helical track.

The above discussion with respect to the wheel assemblies and their relation to both the helical track and the undercarriage is applicable to both embodiments of this invention, that is wherein the wheel assembly bears against three sides of a single flight of the helical track, and wherein the wheel assembly spans two flights of the helical track as referred to above. Further, this above discussion relates to both embodiments of this invention wherein the wheel assembly comprises all wheels as well as the embodiment wherein a combination of wheels and slidable members are used.

It is to be understood that, while the above discussion has been directed to a three legged undercarriage in association with three wheel assemblies, this invention is not so limited. The same principles apply where a four, five, six or more legged undercarriage, and corresponding number of wheel assemblies, are utilized. Further it is within the scope of this invention to provide a different number of wheel assemblies and undercarriage legs, with the proviso that there be at least three of each.

It is preferred in the practice of this invention that each wheel assembly, where such comprises only wheels with no slidable members, comprise two vertical sets of wheels with three wheels in each set, and at least one generally horizontally disposed wheel. It is to be understood that the generally horizontally disposed wheel or wheels are not really horizontal since they are parallel to the helical track flight against which they bear and are therefore canted from the horizontal in the same manner and to the same degree as is the helical track. Where the wheel assembly includes both slidable members and wheel members, it is preferred to provide two generally vertically disposed sets of slidable members per set. The wheel members of such assembly are generally "horizontal" as described above. It is preferred that at least one of the "horizontal" wheel members of each assembly is driven, most preferably by independent drive means, such as an electric motor mounted directly on each wheel assembly. It is within the scope of this invention to provide more than one wheel per wheel assembly and to drive each drive wheel with a separate and individual drive means, e.g., an electric motor.

Another aspect of this invention resides in the use of the undercarriage described above directly as the load carrying member of the elevator described herein. In this aspect of this invention, it is possible to utilize the monoplanar undercarriage assembly described above with a platform affixed thereto, which platform is itself substantially monoplanar, to carry the elevator load. Suitable equipment may be mounted on the platform to move a load onto and/or off of the platform. Thus, in the preferred use of the elevator of this invention in a parking garage for lifting and storing cars, suitable loading and unloading devices, such as those described in application Ser. No. 644,270, filed June 7, 1967, may be conveniently provided on such platform. This equipment may be powered by the same drive means as operates the drive wheels referred to above. It is preferred, however, that the apparatus for taking on and putting off loads be powered by a separate power source, preferably electric motor means. As a safety factor, the power drive circuitry may be so assembled that the wheel means drives and the loading means drives are not operable at the same time.

It is further within this aspect of this invention to utilize the legs of the undercarriage, or at least one of them, directly as load carrying members with or without a platform affixed to each, but without a platform joining and spanning the multiple legs of the undercarriage. Accordingly, where the legs of the undercarriage of the elevator of this invention are not coplanar, each of them or one of them may serve as a load carrying member. Thus in a three legged arrangement, the highest of the three legs may be of sufficient size and strength to support loading and unloading machinery as well as the load being carried. Still further, loading and unloading machinery may be mounted on each coplanar or non-coplanar leg and each such leg made of sufficient size and strength to support both the loading and unloading apparatus as well as the load itself. Thus, in a three legged undercarriage used for parking automobiles, three automobiles can be transported up or down simultaneously. Such three automobiles would be loaded, stored and/or unloaded sequentially but would be carried aloft or returned to ground level simultaneously.

A further aspect of this invention resides in the use of a counterweight system in conjunction with the elevator of this invention described above. It is preferred to employ a counterweight system which substantially balances the tare weight of the elevator structure, in an unloaded condition, together with the associated wheel assemblies and supporting members. Thus positive power is required to move the elevator up or down when such is in an unloaded condition; however, such power requirements are small. It is preferred to provide a balanced counterweight system whereby several counterweights are utilized so as to symmetrically distribute the weight over the cross-section of the structure.

A counterweight system according to this embodiment of this invention is preferably of the full cycle type; that is, the weights are disposed parallel to the elevator in shafts of their own disposed radially from the elevator. Cables, or other similar means, lead from the top and the bottom, respectively, of the elevator to the top and bottom, respectively, at each counterweight over appropriately spaced and positioned pully means. Since the elevator according to this invention travels on a spiral track, such elevator naturally rotates. Swivel means are therefore provided both at the top and bottom of the elevator. It is preferred to provide as many counterweights, and associated cable means, as there are legs in the undercarriage of the elevator, that is, at least three such counterweights. In fact, it is most preferred to provide three such counterweights regardless of the number of legs in the elevator undercarriage, each of which rides in a shaft spaced about 120° apart, regardless of the number of legs in the undercarriage.

It should be noted that the elevator, spiral track and wheel assemblies associated therewith are adapted for use either as an inside, shaft type elevator, or as an outside, circumferential type elevator. All the principles set forth above apply equally to either construction.

For an outside, circumferential type elevator, the counterweight arrangement discussed above may be assembled in somewhat different manner than with an inside, shaft type elevator. With a circumferential type elevator there are suitably an evenly spaced number, preferably at least three, of cable means extending upwardly from the elevator assembly to a rotatable pulley-bearing plate or assembly at the top of the structure. The cable means pass over their respective pulleys and are attached to single axially disposed counterweight, possibly through a swivel means. This axially disposed swivel means suitably rides in a shaft.

Undertanding of this invention will be facilitated by reference to the accompanying drawing in which:

FIG. 1 is a schematic elevation of a garage, warehouse or other building utilizing the invention hereof;

FIG. 2 is a plan view of an internal helical track and elevator assembly according to this invention;

FIG. 3 is a layout view of two flights of a helical track with a layout of a non-coplanar three legged undercarriage assembly as well as one form of wheel assembly associated therewith;

FIG. 4 is a layout view of one flight of a helical track with a layout of a substantially monoplanar three legged undercarriage assembly as well as one form of wheel assembly associated therewith;

FIG. 5 is a radial elevation of the wheel assembly shown in FIG. 3 in association with a portion of two flights of a helical track;

FIG. 6 is a tangential elevation, partially in section, of the wheel assembly shown in FIGS. 3 and 5;

FIG. 7 is a radial elevation of the wheel assembly shown in FIG. 4 in association with a portion of one flight of a helical track;

FIG. 8 is a tangential elevation, partially in section, of the wheel assembly shown in FIGS. 4 and 7;

FIG. 9 is a radial elevation of a wheel-slidable member assembly in association with a portion of one flight of a helical track;

FIG. 10 is similar to FIG. 9 showing a modified wheel-slidable member assembly; and FIG. 11 is an elevation of an inside, shaft type elevator undercarriage assembly having cable and associated swivel means thereon for use in a counterweight arrangement.

Referring now to the drawing, and particularly to FIG. 1 thereof, a structure is shown having an axial elevator shaft 1 and a helical wound floor 2. The helical floor is divided into rooms or compartments 3. The pitch of the helix is so chosen as to be equivalent to the height of one room or compartment so that a plurality of "floors" 2a are created.

A helical track 5 is provided about the shaft 1 which follows the floor 2. An elevator assembly 8 is provided within the shaft which elevator comprises an undercarriage 7 and wheel assemblies 6 associated therewith. The wheel assemblies 6 ride on, or in association with, the helical track 5. The undercarriage 7 is made up of a multiplicity of legs 7a joined together at the ends thereof either directly or through suitable spacer means 7b. As shown each leg 7a is adapted to receive a vehicle or load thereon and is thus provided with loading and unloading apparatus 8a. As shown in FIGS. 1, 2 and 3, the undercarriage 7 is an equilateral triangle with each leg 7a positioned substantially horizontally.

In order to compensate for the dead or tare weight of the elevator 8, and possibly a portion of the load, counterweight means 12 are provided attached to the elevator through cable means 10 about pulleys 11. As shown in FIG. 11, the cable means 10 are attached through swivel means 9 and additional cable means 10a to the undercarriage 7. The counterweights 12 suitably ride in special shafts 12a therefor. In the alternative, these weights may merely ride between rooms 3 on the helically wound floors 2a.

Referring now to FIGS. 3 and 5, there is shown an undercarriage 7 made up of three legs 7a', 7a'', and 7a'''. The first leg 7a' is joined to the second leg 7a'' at adjoining ends by fixing the top of the first leg 7a' to the bottom of the second leg 7a''. Similarly the top of the second leg 7a'' is fixed to the bottom of the third leg 7a'''. The triangle is completed by joining the top of the third leg 7a''' to the bottom of the first leg 7a' through suitable spacer means 7b.

Wheel assemblies 6 are shown to be mounted to the undercarriage at or near the point where each of the legs is joined together. As shown in FIGS. 4, 5 and 6, the wheel assembly is made up of two sets of vertical wheels 13 and 16 each bearing on successive flights of the helical track 5a and 5b. Each vertical wheel set is shown to have three wheels 13a, 13b, and 13c, and 16a, 16b, and 16c, respectively. The wheel axes of each vertical wheel set are aligned with each other so that the plane formed thereby is substantially parallel to the plane of the helical tracks 5a and 5b respectively. Wheels 19 and 20 are provided in radial abutting relation to each track 5b and 5a respectively. The axes of these wheels 19 and 20 are substantially perpendicular to the plane of the upper and lower surfaces of the helical track 5. A structural assembly 8b is provided to hold the wheels together in proper relationship to one another and to join the wheel assembly to the undercarriage. Each radially abutting wheel 19 and 20, respectively, has an electric motor 15 and 24, respectively, associated therewith. The flight 5a of the helical track is shown to have a radially directed surface 23a, a lower surface 17a, and an upper surface 18a. The flight 5b of the helical track is shown to have a radially directed surface 23b, a lower surface 17b and an upper surface 18b.

Particulars of the connection of the wheel assembly 6 to the supporting construction 8b can additionally be seen in FIGS. 5 and 6. The undercarriage assembly is supported by the wheels 13 and 16, carried in bearings with the axles 14 and 14a between the flights of the helical track and bearing against the bordering surfaces 17b and 18a for taking up of positive and negative vertical forces. The horizontal axles 14 and 14a are carried in cross beams 25 and 26 which are rigidly or resiliently connected to the supporting structure 18b by connecting bars 27 and 28 as well as 29 and 30. Axle bearings 31 and 32 are also connected to the cross beams 25 and 26 to which the motors 24 for the drive of the wheels 19 and 20 are connected suitably by flanges.

An alternate wheel assembly 6 and supporting structure therefor including the drive means therefor is shown in FIGS. 4, 7 and 8. In this embodiment the undercarriage assembly is substantially monoplanar. The wheel assembly 6 is shown attached to a console 33. The wheel assembly of this embodiment is wrapped around one flight of the helical track rather than being supported against two successive flights as shown in FIGS. 3, 5 and 6.

As shown in FIGS. 4, 7 and 8, each wheel assembly 6 comprises two sets 40 and 41 of vertically disposed wheels. The lower wheel set 40 is shown to consist of three wheels 40a, 40b and 40c. The upper wheel set 41 is shown to consist of three wheels 41a, 41b and 41c. A "horizontal" wheel set 42 is shown consisting of two wheels 42a and 42b. Each of the upper vertical wheel sets 41 rides on the upper surface 18a of the helical track. Each of the lower vertical wheel sets 40 rides on the lower surface 17a of the helical track. The horizontal wheel sets 42 ride on the radially directed surface 23a of the helical track. Each of the horizontal wheels are driven by a separate electric motor 43 and 44. Supporting structure for the wheel sets includes axles 45, 46 and 47; cross axle supports 48 and 49; shock absorbers 50; and miscellaneous structural elements 51.

FIG. 9 shows a modification of the embodiment of FIG. 7 including a wheel-sliding member assembly 60 having a "horizontal" wheel set 42 similar to that shown in FIG. 7 with each wheel 42a and 42b being driven by a separate electric motor 43 and 44. Instead of the upper and lower wheel sets shown in FIG. 7, this embodiment employs an upper and a lower set of slidable members 61 and 62 each of which set is composed of two slidable surfaces 61a and b, and 62a and b.

FIG. 10 shows an embodiment similar to that shown in FIG. 9 wherein the upper and lower sliding members respectively, each have only one sliding surface 63 and 64.

What is claimed is:

1. An elevator-building assembly comprising a building having a helical track therearound and an elevator mounted for support on said track; wherein said elevator comprises a platform made up of at least three arms, each of which is connected at both ends thereof to other arms, wherein at least one of said arms is adapted to solely support a load; longitudinally extendable load-transfer means mounted in operative position on each of said load supporting arms, which load-transfer means is alignable with at least some of a multiplicity of load-storage spaces disposed within said building, the entrance to which spaces is positioned between flights of said helical track; wheel means at the juncture of each pair of arms, mounted in operative association with said helical track for support by said track and, in turn, support of said arms, wherein said wheel means comprises a multiplicity of contact means contacting said helical track on a multiplicity of surfaces thereof.

2. The improved elevator assembly claimed in claim 1 wherein each wheel assembly has multiple contact means some of which contact an upper surface of said helical track, some of which contact a lower surface of said helical track and some of which contact a radially directed surface of said helical track.

3. The improved elevator assembly claimed in claim 1 wherein all of said contact means are rotatable, relatively smooth surfaced wheels.

4. The improved elevator assembly claimed in claim 3 wherein said wheel surfaces have tread grooves therein.

5. The improved elevator assembly claimed in claim 3 wherein said wheels include resilient, pneumatic tires.

6. The improved elevator assembly claimed in claim 3 wherein said wheels include resilient, substantially solid tires.

7. The improved elevator claimed in claim 1 wherein each of said wheel assemblies extends between and bears against two successive flights of said helical track.

8. The improved elevator claimed in claim 1 including at least three substantially symmetrically disposed wheel assemblies.

9. The improved elevator claimed in claim 1 wherein each of said wheel assemblies contains at least one drive wheel associated with individual power source means.

10. The improved elevator claimed in claim 9 wherein contact surfaces of said wheel means are in surface contact with an upper, a lower and a radially directed surface of said helical track and wherein said drive wheel is in contact and bears against said radially directed surface of said helical track.

11. The improved elevator claimed in claim 1 wherein said contact surfaces include wheel means and slidable surface means.

12. The improved elevator claimed in claim 11 wherein said wheel means are in contact with and bear against a radially directed surface of said helical track.

13. The improved elevator claimed in claim 12 wherein each wheel of said wheel means is individually drivable by power supply means associated therewith.

14. An improved elevator assembly as claimed in claim 1 including three elongated members substantially in the form of a substantially equilateral triangle.

15. The improved elevator assembly claimed in claim 1 including a multiplicity of said wheel assembly means each adjacent to an intersection of two sides of said polygon.

16. The improved elevator assembly claimed in claim 1 wherein said polygon is substantially monoplanar.

17. The improved elevator assembly claimed in claim 1 wherein each leg of said polygon is substantially horizontal and wherein each of said legs is in a different plane.

18. The improved elevator assembly claimed in claim 1 wherein each leg of said polygon is adapted to individually support a load.

19. The improved elevator assembly claimed in claim 18 wherein each of said legs has loading and unloading apparatus mounted thereon.

20. The improved elevator assembly claimed in claim 1 adapted to support an automobile load on each leg of said polygon.

21. The improved elevator assembly claimed in claim 1 including counterweight means operatively associated therewith.

22. The improved elevator assembly claimed in claim 21 wherein said counterweight means is attached to both the top and the bottom of said elevator through cable means.

23. The improved elevator assembly claimed in claim 21 wherein said counterweight means is attached to both the top and bottom of said elevator through swivel means.

24. The improved elevator assembly claimed in claim 21 including three substantially symmetrically disposed counterweight means.

25. An elevator assembly as claimed in claim 1, wherein said arms are each substantially horizontal and are each at a different level.

26. An elevator assembly as claimed in claim 1, wherein said wheel means spans a flight of said helical guide track.

27. An elevator assembly as claimed in claim 1, wherein said helical guide track is disposed peripherally about a central core of said building.

References Cited

UNITED STATES PATENTS 1,709,914   4/1929   Klanke _____ 214—16.1

FOREIGN PATENTS 857,687   12/1952   Germany.
991,691   5/1965   Great Britain.

GERALD M. FORLENZA, *Primary Examiner.*

R. B. JOHNSON, *Assistant Examiner.*

U.S. Cl. X.R.

187—25